United States Patent [19]

McPherson

[11] 4,423,320
[45] Dec. 27, 1983

[54] ENCODED CARD READER

[75] Inventor: Bruce M. McPherson, Maitland, Fla.

[73] Assignee: NCR Corporation, Dayton, Ohio

[21] Appl. No.: 358,933

[22] Filed: Mar. 17, 1982

[51] Int. Cl.³ .............................................. G06K 13/00
[52] U.S. Cl. .................................. 235/482; 235/474; 235/479
[58] Field of Search ................ 235/482, 443, 474, 479

[56] References Cited

U.S. PATENT DOCUMENTS

| 3,592,972 | 7/1971 | Lane | 235/482 |
| 3,866,827 | 2/1975 | Obata | 235/482 |
| 3,976,858 | 8/1976 | Haun | 235/482 |
| 4,236,667 | 12/1980 | Crowley | 235/443 |

Primary Examiner—Harold I. Pitts
Attorney, Agent, or Firm—J. T. Cavender; Wilbert Hawk, Jr.; Richard W. Lavin

[57] ABSTRACT

A reader for punched hole cards having a movable housing member containing a coil spring is disclosed, the housing member is actuated by a card inserted in the reader and moved to an activated position against the action of the spring. Secured to the housing member is an air vane governor rotated upon movement of the housing member to an inserted position. Upon release of the card, the card is driven past sensing members by the spring at a constant speed controlled by the rotating air vane governor. Timing means associated with the punched hole configuration of the card being read is provided.

6 Claims, 9 Drawing Figures

ENCODED CARD READER

BACKGROUND OF THE INVENTION

The present invention is directed to a reader mechanism for reading cards having encoded data located thereon and more particularly, to a card reader for reading cards and identification badges having data represented by punched holes therein.

The use of plastic cards having encoded data thereon has expanded in recent years. Today such cards are used as part of banking transactions, credit purchases and security identification. In those situations where the card is inserted into a card reader by hand without supervision or assistance, it is essential that the card reader be constructed to provide an acceptable rate of successful read operations. Prior card readers have been constructed which include a slidable carriage assembly engaged by the inserted card. After insertion of the card, the carriage assembly under the control of a drive member such as a spring moves the card past a sensing member which senses the encoded data on the card as the card moves in a return direction towards the entrance of the card reader. Examples of this type of card reader construction may be found in U.S. Pat. Nos. 4,114,028, 4,130,756 and 4,236,667 in which a punched card is moved past optical sensing members. Essential to the use of this type of card reader is the speed at which the card moves past the sensing members. If the speed of the card is too high or varies as the card moves in the return direction, invalid sensing operations occur which require re-insertion of the card in the card reader. To control the speed of the card, governors have been used in conjunction with the spring drive. Examples of this type of construction may be found in U.S. Pat. Nos. 3,885,132 and 3,953,887. The use of governors in the prior art have resulted in complex mechanisms resulting in costly card readers.

It is therefore an object of this invention to provide a card reader for reading punched cards in which the card is driven past the sensing members at a constant speed. It is a further object of this invention to provide a card reader capable of reading cards having different configurations of punched holes in the card. It is another object of the invention to provide a card reader which is simple in construction and therefore low in cost.

SUMMARY OF THE INVENTION

In order to fulfill these objects, there is disclosed a card reader for reading a plurality of cards, each having different configurations of punched holes, which includes a base member slidably supporting a spring carrier member actuated by the card upon insertion of the card in the reader. Secured to the carrier member is an air vane governor which is rotated through a rack and pinion arrangement upon movement of the carrier member by the inserted card. A pair of printed circuit boards containing a light source and detector means are positioned adjacent the path of movement of the card for sensing the holes in the card. Insertion of the card within the reader moves the spring carrier, thereby unwinding a coiled constant force spring. Upon release of the card, the spring carrier under the action of the spring moves the card past the printed circuit boards at a speed controlled by the rotating air vane governor.

BRIEF DESCRIPTION OF THE DRAWINGS

Additional advantages and features of the present invention will become apparent and fully understood from a reading of the following description, taken in conjunction with the annexed drawing, in which.

DESCRIPTION OF THE PREFERRED EMBODIMENT

Figure 5:
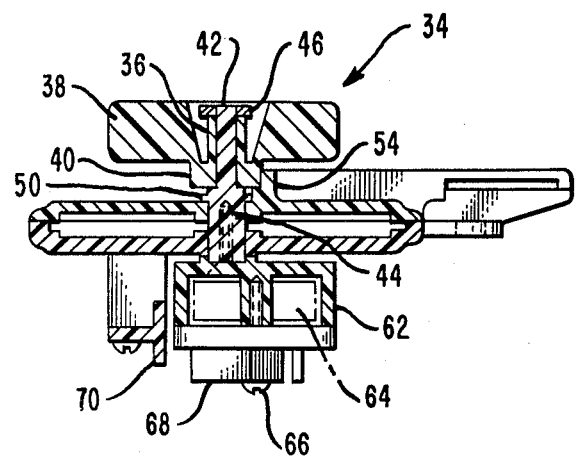
FIG. 5 is a sectional view taken along lines 5—5 of FIG. 1.
Figure 6:
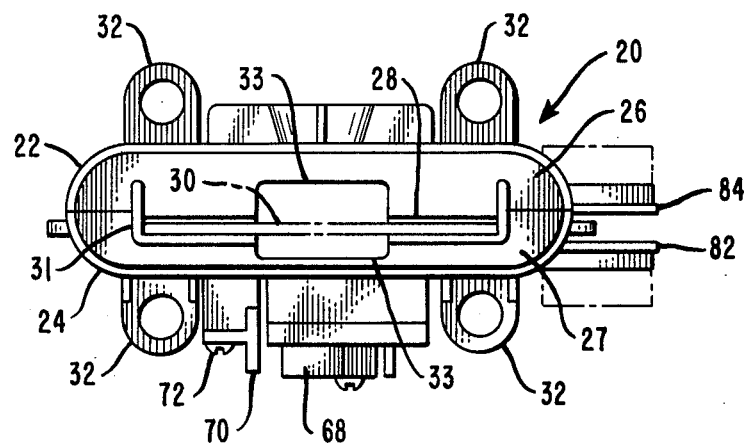
FIG. 6 is a front elevational view of the subject card reader.
Figure 7:
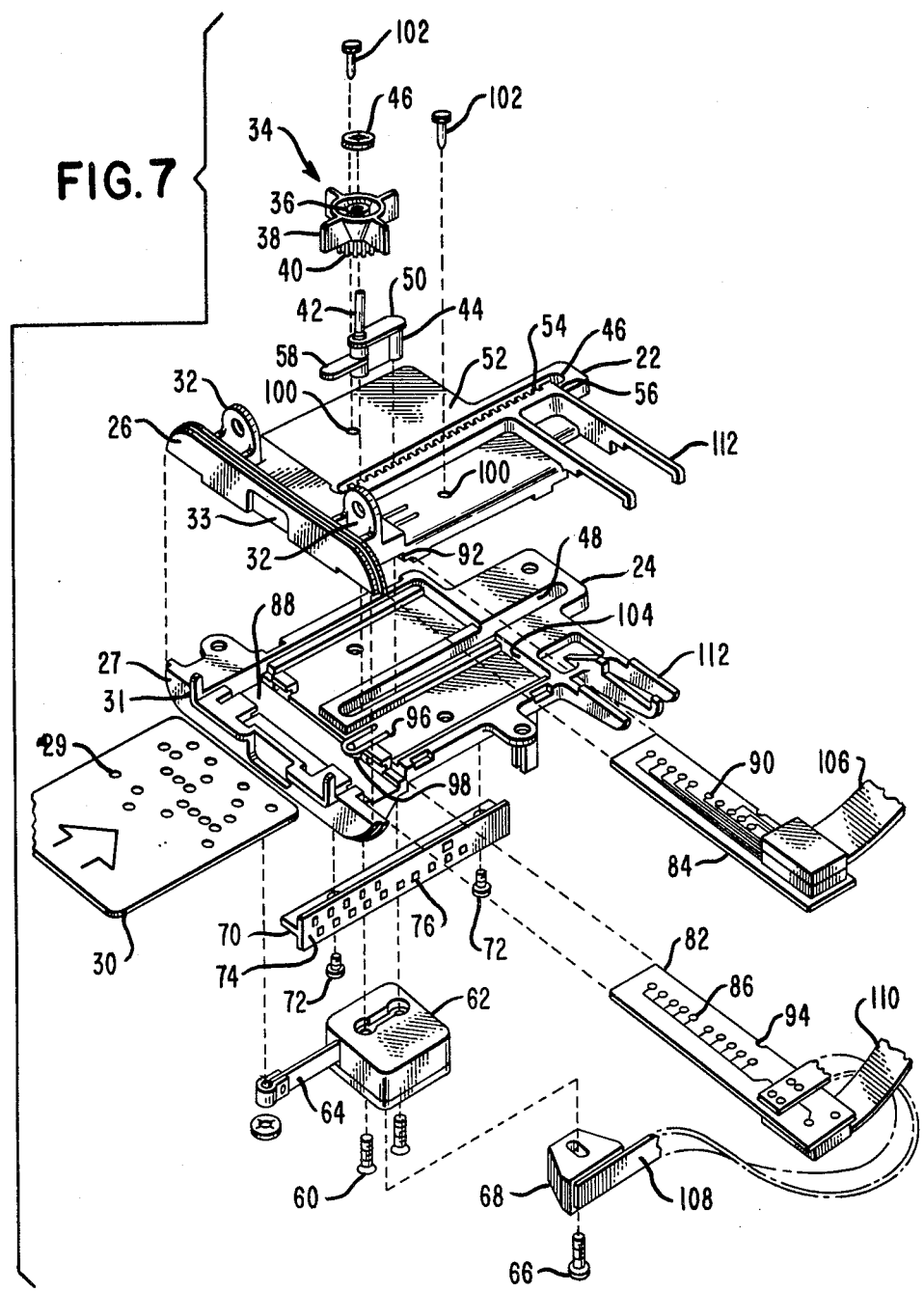
FIG. 7 is an exploded perspective view of the various components of the subject card reader.
Figure 9:
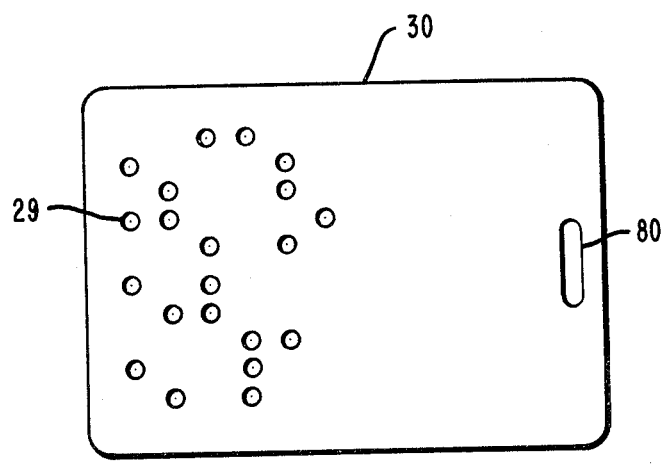
FIG. 9 is a plan view of a card that may be used with the card reader of the present invention showing another configuration of punched holes in the card.

Referring to FIGS. 1-7 inclusive, there is shown various views of the card reader of the present invention which includes in its construction a housing assembly indicated generally by the numeral 20 (FIGS. 1, 3, 4 and 6) comprising an upper housing member 22 bonded to a lower housing member 24. The housing members 22 and 24 may be molded from a plastic material such as polycarbonate. The front end of each of the housing members 22 and 24 consists of a flange portion 26 and 27 respectively (FIGS. 6 and 7), each having a recessed area forming a slot 28 into which may be inserted a card 30 (FIG. 1) having information bearing elements located thereon such as punched holes 29 (FIGS. 7 and 9). Extended from the flange portion 27 is a card support member 31. The flange portions 26 and 27 further define a recessed portion 33 which accommodates a clip member as is in many instances found attached to cards used as identification badges. As best seen in FIG. 6, both of the housing members 22 and 24 have mounting ears 32 molded therein, allowing the card reader to be mounted by mounting means such as bolts or the like to a vertical support member (not shown).

Figure 1:
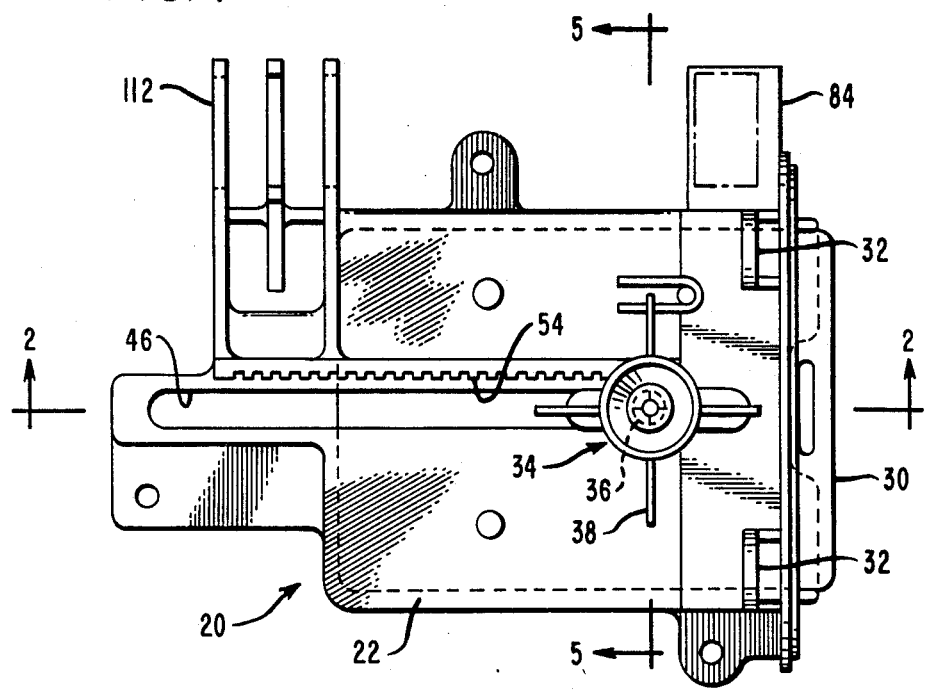
FIG. 1 is a top elevational view of the card reader making up the present invention.
Figure 2:
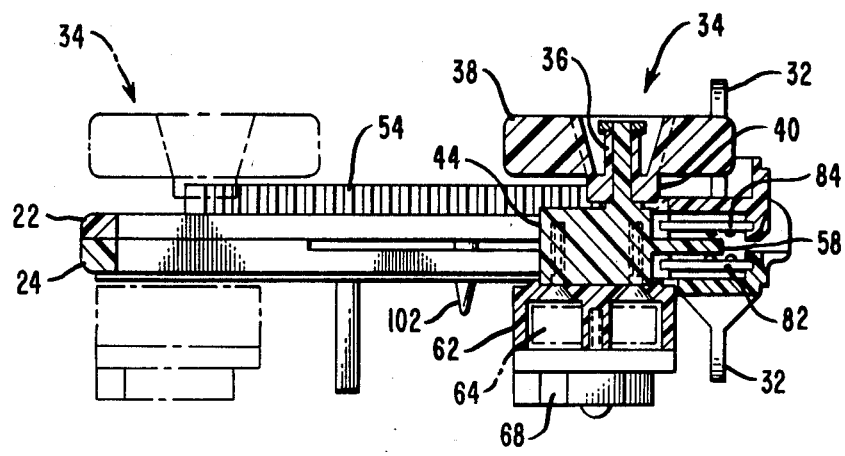
FIG. 2 is a sectional view taken along lines 2—2 of FIG. 1 showing details of the air vane governor.
Figure 3:
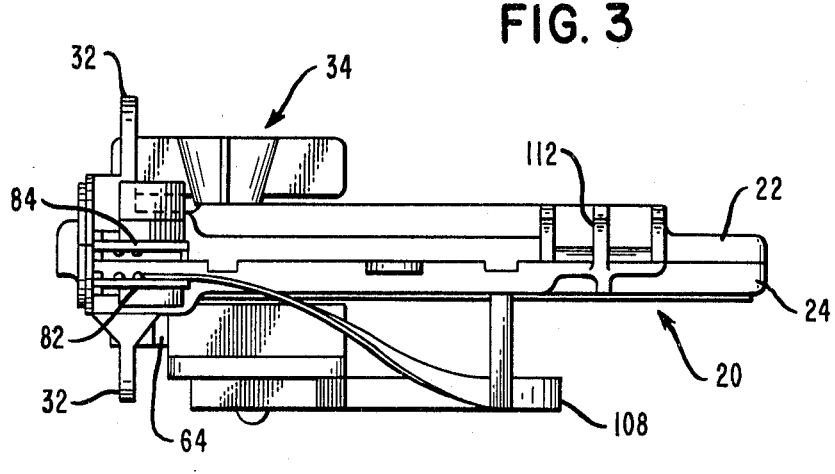
FIG. 3 is a right side elevational view of the subject card reader.
Figure 4:
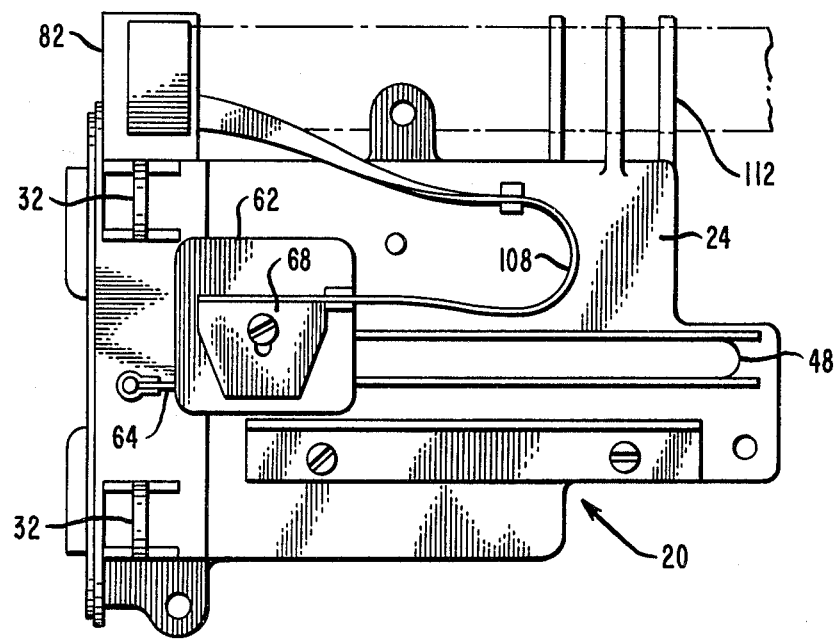
FIG. 4 is a bottom elevational view of the subject card reader.

Associated with the housing assembly 20 is a speed control mechanism for controlling the speed of the entry and return movement of the inserted card. Included in this control mechanism is a speed governor member generally indicated by the numeral 34 (FIGS. 1-7 inclusive) comprising a support portion 36 having a plurality of air vane portions 38. The lower portion of the support portion 36 comprises a pinion gear portion 40 (FIGS. 2, 5 and 7). The support portion 36 is rotatably mounted on the shaft portion 42 of a guide support member 44 by any suitable fastening means such as a clip 46. The guide support member 44 is located within mating slots 46 and 48 located in the upper housing member 22 and in the lower housing member 24, respectively (FIG. 7). The guide support member 44 is supported within the slots 46 and 48 by a lip portion 50 (FIGS. 5 and 7) which is positioned on the top surface 52 of the upper housing member 22. When located within the slots 46 and 48, the guide support member 44 positions the pinion gear portion 40 of the speed governor member 34 into engagement with rack teeth members 54 formed in a raised portion 56 of the upper housing member 22. The guide support member 44 also includes a forwardly-extending arm portion 58 (FIGS. 2 and 7) which is positioned within the slot 28 (FIG. 6) to intercept a card member 30 when inserted within the slot. Movement of the card within the slot 28 will drive the guide support member 44 along the slots 46 and 48 resulting in the rotation of the speed governor 34 due to engagement of the pinion gear portion 40 with the rack teeth members 54.

Figure 8:
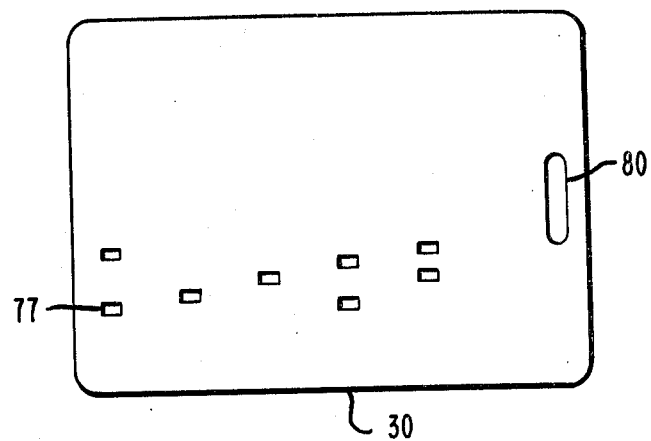
FIG. 8 is a plan view of a card that may be used with the card reader of the present invention showing one configuration of punched holes in the card.

Also secured to the guide support member 44 by means of screws 60 or the like is a housing member 62 (FIGS. 2-7 inclusive) within which is located a coiled constant force spring member 64 having one end secured to the front portion of the lower housing member 24. Secured to the lower surface of the housing member 62 by means of a screw member 66 is a dual sensing member 68 which contains a photodiode element for generating a sensing beam of light and a photodetector element (not shown) for detecting the reflected light beam. Associated with the sensing member 68 is a timing bar member 70 (FIGS. 5-7 inclusive) secured to the bottom surface of the lower housing member 24 by means of screw members 72. The timing bar member 70 includes a sensing surface 74 (FIG. 7) having a dark background and two rows of timing marks or bars 76 each having a white surface. The timing bars 76 are used in reading cards having two types of punched hole configurations. As shown in FIG. 8, there is shown a card 30 representing the well-known "Hollerith" code having holes 77 punched in the shape and spacing of computer input punch cards. A second card 30 that may be used with the card reader of the present invention is shown in FIG. 9, which includes five horizontal rows of coded punched holes 29. Each of the cards 30 shown in FIGS. 8 and 9 includes a clip hole 80 which may accommodate a badge clip for positioning the card on the pocket of the owner. If the card to be read has the configuration shown in FIG. 9, the timing bar member 70 is mounted as shown in FIG. 7 locating the longer rows of timing bars 76 in the lower position. If, on the other hand, the card having the configuration shown in FIG. 8 is to be read, the timing bar member 70 is reversed to position the shorter row of timing bars 76 in the lower position so as to be adjacent the sensing member 68.

Located within the housing assembly 20 are a pair of printed circuit boards 82 and 84 (FIGS. 1-5 inclusive and 7). The printed circuit board 82 includes a row of photodiodes 86 and is positioned in a slot 88 located in the lower housing member 24. The printed circuit board 84 includes a row of photodetectors 90 and is positioned within a slot 92 (FIG. 7) located within the upper housing member 22 and aligned with the slot 88 in the lower housing member 24. The printed circuit board 82 has a notch 94 which engages a detent arm portion 96 (FIG. 7) located within a slot 98 in the lower housing member 24. A similar construction is arranged for the printed circuit board 84 in the upper housing member 22.

Positioned in the upper housing member 22 are a pair of spaced holes 100 (FIG. 7) into which may be positioned removable pin members 102. When inserted in the holes 100, such pin members 104 will stop the rearward movement of the card 30 within the slot 28. The pin members 102 are used with the card having the hole configuration shown in FIG. 9. If the card shown in FIG. 8 is to be read, the pin members 102 are removed and the card 30 is stopped by the rear edge portion 104 (FIG. 7) of the lower and upper housing members 22 and 24.

In the operation of the reader, upon initiated insertion of the card 30 within the slot 28, the card will engage the arm portion 58 of the guide support member 44, (FIG. 2) and thereby move, during manual inward movement of such card, the support member 44 along with governor member 34 toward the rear of the slots 46, 48 (to the phantom position shown in FIG. 2) until the card engages either the pin members 102 or the rear edge portion 104 of the reader, as the case may be for the particular card 30 being used (FIGS. 8 and 9). This movement of the support member 44 by the card 30 results in the uncoiling of the one end portion of constant force spring 64 and tensioning such spring in the housing member 62. Upon release of the card, the spring 64 will return the support member 44 and the card 30 forwardly towards the opening of the slot 28—at a speed of movement which is controlled by the governor member 34 rotation due to the rack and pinion engagement between the pinion gear 40 of the governor 34 and the rack teeth members 54 of the upper housing member 22. As the card 30 moves towards the opening of the slot 28, the punched holes in the card will intercept the light beams generated by the photodiodes 86 allowing each punched hole to transmit a light beam which is detected by the aligned photodetectors 90. Electrical signals generated by the photodetectors 90 in response to detecting the light beams originating from the punched holes in the card are transmitted over the ribbon cable 106 (FIG. 7) to the system control electronics associated with the present card reader (not shown herein). In a similar manner, the movement of the sensing member 68 past the surface 74 of the timing bar member 70 will generate timing signals upon sensing the location of the timing marks or bars 76 in a manner that is well-known in the art. Such timing signals generated by the sensing member 68 are transmitted over the ribbon cable 108 (FIGS. 3 and 7), the printed circuit board 82 and the ribbon cable 110 (FIG. 7) to the system control electronics for use in identifying the row of punched holes being read by the photodetector 90. As illustrated in FIGS. 1, 3, 4 and 7, support fingers 112 extend from the upper and lower housing members 22, 24 for supporting the ribbon cables 106 and 110.

It will be seen from the construction herein described that the return movement of the card 30 is caused by the recoiling of the constant force spring 64 and controlled by the rotation of the air vane governor 34 resulting in the card moving past the sensing members 90 at a uniform rate of speed, thus producing a very high rate of valid read operations. The constant return speed also allows the operator to easily recover the card from the reader.

While there has been described a card reader for reading cards with punched holes located therein, it is obvious that the card reader will also perform its intended function if either a bar code or other mark containing card or a magnetic stripe card is to be read. Modified printed circuit boards 82 and 84 could be employed in the one instance for accommodating an optical read head in well-known manner and a magnetic read head could be substituted for reading the magnetic stripe in a manner that is also well-known in the art.

I claim:

1. An apparatus for reading a record member having data representing indicia comprising:
   a first housing assembly having a supporting surface for slidably supporting a record member for movement between a home position and a displaced position and an enclosure member mounted on said supporting surface having a first drive portion;
   a second housing assembly slidably mounted on said enclosure member and engaged by a record member positioned on said supporting surface for movement by said record member between a home and displaced position;
   a spring member interconnected between the first and second housing assembly for urging said second housing assembly and the record member from the displaced position to the home position;
   means mounted on said first housing assembly for sensing the indicia of the record member during the movement of the record member from the displaced position to the home position;
   and a speed limiting device rotatably mounted on said second housing assembly including a support member rotatably secured to said second housing assembly having a second drive portion engaging said first drive portion and a plurality of vane members extending outwardly therefrom, said support member adapted to be rotated by said first and second drive portions during the movement of said second housing assembly under urgence of said spring member whereby the rotation of said vane members limits the movement of said second housing member past said sensing means to a constant speed.

2. The apparatus of claim 1 which further includes an elongated timing member removably secured to said supporting surface, said timing member having a plurality of timing indicia located thereon and extending in the direction of movement of the record member, said apparatus further including a sensing member secured to said second housing assembly and positioned adjacent said timing member whereby said sensing member is adapted to generate control signals representing the location of the record member in said first housing assembly in response to sensing said timing indicia upon movement of said second housing assembly by said spring member.

3. The apparatus of claim 2 in which said second housing assembly includes a guide member slidably mounted on said enclosure member and rotatably supporting said support member, said guide member positioned to be engaged by a record member positioned on said supporting surface for movement thereby to said displaced position, said second housing assembly further including a housing member secured to said guide member and housing said spring member.

4. The apparatus of claim 3 in which said spring member comprises a coiled constant force spring having one end secured to said first housing assembly whereby upon movement of said guide member to said displaced position, said constant force spring member is tensioned to urge said guide member to said home position.

5. The apparatus of claim 4 which further includes removable stop members positioned in said first housing assembly to limit the movement of said guide member to a predetermined position with respect to said first housing assembly.

6. An apparatus for reading card members having data representing punched holes located therein comprising:
   a first housing assembly comprising an upper member and a lower member forming a card receiving enclosure, said upper and lower members including a recess defining an entrance to said enclosure and an aligned slot extending from the front to the rear of the enclosure, said upper member further including a plurality of gear teeth extending along said slot;
   a second housing assembly including a guide member mounted in said aligned slots and having an arm portion positioned in the path of movement of the card member whereby upon insertion of said card member within said enclosure said guide member is moved along said aligned slots between a home position and a displaced position, said second housing assembly further including a housing member secured to said guide member and located adjacent said lower member;
   a spring member mounted within said housing member and having one end secured to said lower member, said spring member being conditioned upon movement of the guide member to said displaced position to urge return of said guide member to said home position;
   a timing member carried by said lower member and extending in a direction parallel to said aligned slots, said timing member having timing marks located thereon;
   a sensing member carried by said housing member for sensing the timing marks on said timing member, said sensing member generating control signals representing the location of said card member;
   a first printed circuit board member mounted in the lower member transverse to the movement of said card member, said printed circuit board member including a row of photodiodes for generating a plurality of light sensing beams;
   a second printed circuit board member mounted in said upper member juxtaposed with said first printed circuit board member, said second printed circuit board member including a plurality of photodetectors for detecting the punched holes in said card members upon the holes intercepting a light beam from said photodiodes;
   and a speed governor support portion rotatably mounted on said guide member adjacent the upper surface of said upper member, said speed governor support portion having a gear portion engaging said gear teeth portions and includes a plurality of outwardly extending vane members whereby upon movement of said guide member to the displaced position by the insertion of a card member in the entrance of the enclosure, said speed governor support portion is rotated during the return movement of the guide member to said home position by the action of the spring member enabling said vane members to limit the movement of the card member past said first and second printed circuit board members at a constant speed.

* * * * *